United States Patent
Waligorski

(10) Patent No.: US 9,488,722 B2
(45) Date of Patent: Nov. 8, 2016

(54) TIME-OF-FLIGHT RANGING SYSTEM AND METHOD WITH EXTENDED RANGE

(71) Applicant: Gregory M. Waligorski, Redondo Beach, CA (US)

(72) Inventor: Gregory M. Waligorski, Redondo Beach, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 293 days.

(21) Appl. No.: 14/109,639

(22) Filed: Dec. 17, 2013

(65) Prior Publication Data
US 2014/0362364 A1    Dec. 11, 2014

Related U.S. Application Data

(60) Provisional application No. 61/831,588, filed on Jun. 5, 2013.

(51) Int. Cl.
| | | |
|---|---|---|
| *G01C 3/08* | (2006.01) | |
| *G01S 7/491* | (2006.01) | |
| *G01S 17/36* | (2006.01) | |
| *G01S 17/89* | (2006.01) | |

(52) U.S. Cl.
CPC .............. *G01S 7/4915* (2013.01); *G01S 17/36* (2013.01); *G01S 17/89* (2013.01)

(58) Field of Classification Search
CPC ........ G01S 17/06; G01S 17/10; G01S 17/89; G01S 7/483; G01S 7/4915
USPC ....................................................... 356/5.01
See application file for complete search history.

(56) References Cited

U.S. PATENT DOCUMENTS

| | | | | |
|---|---|---|---|---|
| 3,683,285 A | * | 8/1972 | Wild ...................... | G01R 25/00 327/3 |
| 5,054,912 A | * | 10/1991 | Kuchel ................... | G01S 17/87 356/487 |
| 5,488,620 A | * | 1/1996 | Minden ................. | H01S 3/0675 372/11 |
| 7,791,715 B1 | | 9/2010 | Bamji | |
| 7,973,912 B2 | * | 7/2011 | Petrov .................... | G01S 17/36 356/5.1 |
| 2011/0058153 A1 | | 3/2011 | Van Nieuwenhove et al. | |
| 2012/0033045 A1 | | 2/2012 | Schweizer et al. | |
| 2012/0092463 A1 | | 4/2012 | Liu et al. | |
| 2013/0016795 A1 | * | 1/2013 | Kunihiro ............... | H03F 1/0288 375/295 |
| 2013/0021595 A1 | * | 1/2013 | Guetta .................. | G01S 17/325 356/4.01 |

OTHER PUBLICATIONS

Choi et al., "Range Unfolding for Time-of-Flight Depth Cameras", Proceedings of 2010 IEEE 17th International Conference on Image Processing Sep. 26-29, 2010, Hong Kong, China.

Droeschel et al., "Multi-frequency Phase Unwrapping for Time-of-Flight Cameras", Proceedings of IEEE/RSJ International Conference on Intelligent Robots and Systems (IROS), Oct. 2010, Taipei, Taiwan.

(Continued)

*Primary Examiner* — Mark Hellner
(74) *Attorney, Agent, or Firm* — Renaissance IP Law Group LLP

(57) ABSTRACT

An embodiment includes a method, comprising: receiving a modulated signal having modulation; generating a first signal in response to the modulation and a first sampling signal; generating a second signal in response to the modulation and a second sampling signal; and generating a distance in response to the first signal and the second signal. A ratio of a frequency of the first sampling signal to a frequency of the second sampling signal is a rational number.

16 Claims, 9 Drawing Sheets

(56) References Cited

OTHER PUBLICATIONS

Droeschel et al., "Probabilistic Phase Unwrapping for Time-of-Flight Cameras", Proceedings of Joint 41th International Symposium on Robotics and 6th German Conference on Robotics, Jun. 2010, Munich, Germany.

Hinz et al., paper citing Jutzi "Extending the range measurement capabilities of modulated range imaging devices by time-frequency-multiplexing", AVN—Allgemeine Vermessungs-Nachrichten, Ausgabe Feb. 2012: pp. 54-62.

Jutzi, "Investigations on ambiguity unwrapping of range images", Laserscanning 2009, edited by F. Bretar, M. Pierrot-Deseilligny and G. Vosselman, International Archives of Photogrammetry and Remote Sensing 38 (Part 3/W8), pp. 265-270.

McClure et al., "Resolving depth measurement ambiguity with commercially available range imaging cameras", Image Processing: Machine Vision Applications III, edited by David Fofi, Kurt S. Niel, Proc. of SPIE-IS&T Electronic Imaging, SPIE vol. 7538, 2010.

Payne et al, "Multiple frequency range imaging to remove measurement ambiguity", Proceedings of at 9th Conference on Optical 3-D Measurement Techniques, Jul. 1-3, 2009, Vienna, Austria.

* cited by examiner

TIME-OF-FLIGHT RANGING SYSTEM AND METHOD WITH EXTENDED RANGE

BACKGROUND

This disclosure relates to ranging systems and methods and, in particular, ranging systems that disambiguate distances measured by time-of-flight (TOF) ranging techniques.

A typical TOF system emits a light signal whose intensity oscillates at a single frequency. The system repeatedly integrates the returning "echo" of this signal over a preset fraction (typically ½) of the signal's modulation period, starting and ending at specific modulation phases. At certain times, the system saves a result of the integration, shifts the start and end of the integration time by a preset fraction of the signal modulation period (typically ¼), and resumes the integration. After several repetitions of this procedure, it is possible to calculate from the saved results of the integration the phase shift of the echo signal modulation relative to the original signal modulation. This phase shift is a periodic function of the distance traveled by the light signal, which can be used to measure light travel distances and, by extension, distances to objects reflecting light toward the TOF system. However, the periodicity or "wrapping around" of the phase shift means that multiple different distances of light travel can yield the same phase shift. In other words, the phase-shift-to-distance relation is ambiguous. The ambiguity is removed when it can be said with certainty that only the shortest distance corresponding to each phase shift is plausible, due to, for example, the TOF system being used in an enclosed space where it has no chance to receive an "echo" from objects located further than its so called ambiguity distance, corresponding to 360-degrees phase shift. If no other means to avoid or remove the distance ambiguity are employed, the ambiguity distance must be considered the maximum range of the TOF system. The ambiguity distance is inversely proportional to the light intensity modulation frequency, and therefore it can be lengthened by lowering the frequency. However, doing so may worsen the accuracy of distance measurements done by a TOF system.

SUMMARY

An embodiment includes a method, comprising: receiving a modulated signal having modulation; generating a first signal in response to the modulation and a first sampling signal; generating a second signal in response to the modulation and a second sampling signal; and generating a distance in response to the first signal and the second signal. A ratio of a frequency of the first sampling signal to a frequency of the second sampling signal is a rational number.

Another embodiment includes a system, comprising: a receiver configured to receive a modulated signal; and a controller coupled to the receiver and configured to: generate a first signal in response to a modulation of the modulated signal and a first sampling signal; generate a second signal in response to the modulation and a second sampling signal; and generate a distance in response to the first signal and the second signal. A ratio of a frequency of the first sampling signal to a frequency of the second sampling signal is a rational number.

Another embodiment includes a system, comprising: a signal generator configured to generate a modulated signal; and a controller coupled to the signal generator and configured to cause the signal generator to generate the modulated signal with at least two superimposed amplitude modulations.

Another embodiment includes a system, comprising: a signal generator configured to generate a first modulated signal; a receiver configured to receive a second modulated signal; and a controller coupled to the modulator and the receiver, and configured to: cause the signal generator to generate the first modulated signal with a repeating pulse train having pulse amplitudes with varying amplitudes; generate a first signal in response to modulation of the second modulated signal and a first sampling signal; generate a second signal in response to the modulation and a second sampling signal; and generate a distance in response to the first signal and the second signal. A ratio of a frequency of the first sampling signal to a frequency of the second sampling signal is a rational number.

DETAILED DESCRIPTION

Figure 1:
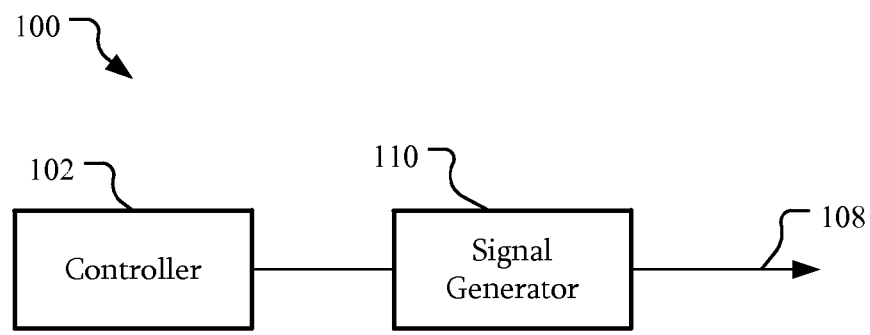
FIG. 1 is a schematic view of a signal generator according to an embodiment.

The embodiments relate to systems and methods to disambiguate distances measured by time-of-flight (TOF) ranging system. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments are described in the context of particular systems having certain components. One of ordinary skill in the art will readily recognize that the present invention is consistent with the use of systems having other and/or additional components and/or other features not inconsistent with the present invention. One of ordinary skill in the art will also readily recognize that the method and system are described in the context of a structure having a particular relationship to a substrate. However, one of ordinary skill in the art will readily recognize that the method and system are consistent with other structures. In addition, one of ordinary skill in the art will readily recognize that the layers could have another structure. The method and system are also described in the context of single elements. However, one of ordinary skill in the art will readily recognize that the method and system are consistent with the use of systems having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a signal generator according to an embodiment. In this embodiment, the system 100 includes a controller 102 coupled to a signal generator 110. The signal generator 110 is configured to generate a modulated signal 108.

In an embodiment, the modulated signal 108 may be an optical signal. For example, an optical signal may include infrared light, visible light, ultraviolet light, or the like. However, in other embodiments, carrier signals in other media such as different frequency electro-magnetic signals, acoustic signals, or the like may be used. Any carrier signal that may be modulated by a modulation described herein and may reflect and/or scatter from an object, surface, or the like may be used. The signal generator 110 may be source appropriate for the desired medium. For example, the signal generator 110 may be a laser diode, a light emitting diode, or the like.

The controller 102 is configured to cause the modulator 110 to generate the modulated signal 108. As will be described in further detail below, a variety of different modulated signals may be generated. The controller 102 can be any variety of devices and systems. For example, the controller 102 may be a specific or general purpose processor, an application specific integrated circuit, a programmable gate array, discrete circuitry, a combination of such devices, or the like.

Figure 2:
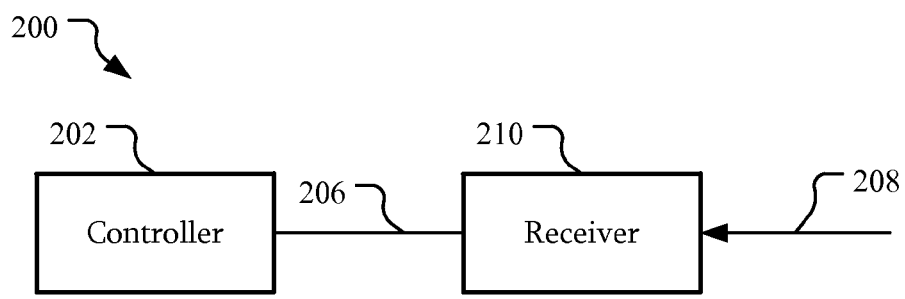
FIG. 2 is a schematic view of a measurement system according to an embodiment.

FIG. 2 is a schematic view of a measurement system according to an embodiment. In this embodiment, the system 200 includes a controller 202 and a receiver 210. The controller 202 may be similar to the controller 102 described above. The controller 202 is coupled to the receiver 210.

The receiver 210 is configured to sense a modulation of a modulated signal 208. In response, the receiver 210 is configured to generate a plurality of signals 206. The controller 202 is configured to receive the signals 206 from the receiver 210. These signals 206 may represent the modulation of the modulated signal 208, integrated periods of the modulated signal 208, a relative phase of a portion of the modulated signal 208, or the like. As will be described in further detail below, the receiver 210 may include one or more sensors, detectors, or the like.

In an embodiment, the receiver 210 may include an electronic rolling shutter (ERS) or a global shutter. As will be described in further detail below, the modulation of the modulated signal 208 may be substantially continuous. That is, the modulation may change a state of the modulated signal 208; however, the type of the modulation does not change. Accordingly, an ERS may be used because the type of modulation of the light signal does not change in time. In contrast, in an embodiment, only the way the signal is integrated is changed.

Figure 3:
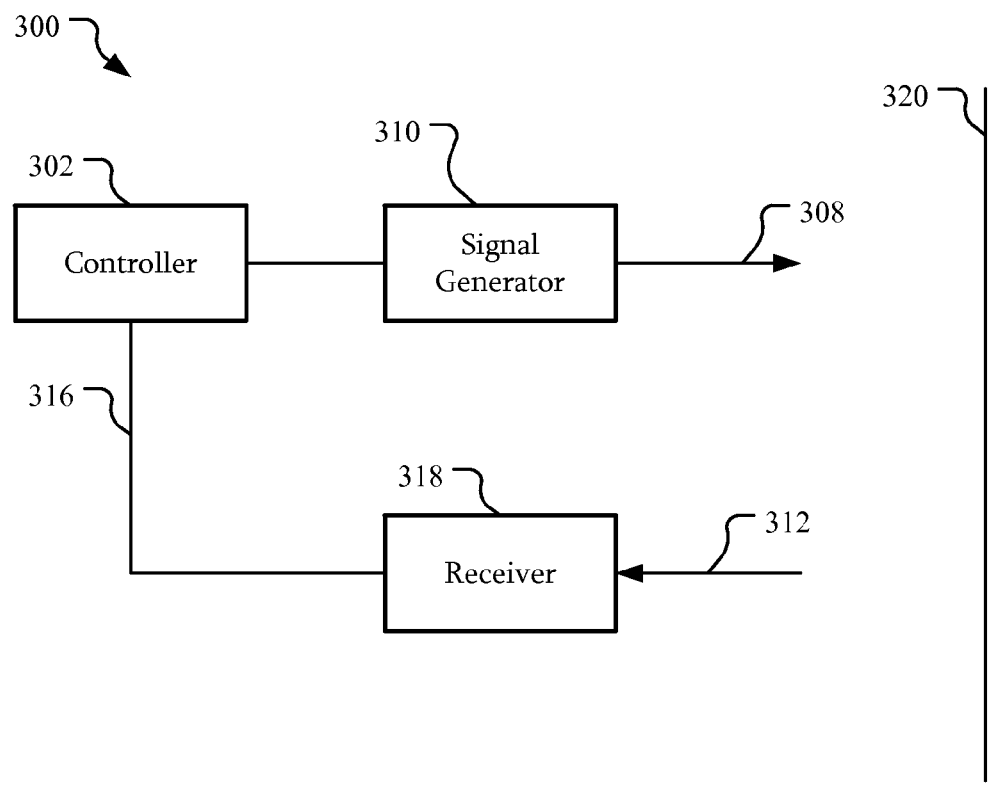
FIG. 3 is a schematic view of a measurement system according to another embodiment.

FIG. 3 is a schematic view of a measurement system according to another embodiment. The system 300 includes a controller 302, a signal generator 310, and a receiver 318. The controller 302, signal generator 310, and receiver 318, may be similar to the controller 202, signal generator 110 and receiver 210 described above. However, the controller 302 is coupled to both the signal generator 310 and the receiver 318.

In an embodiment, the controller 302 may be configured to operate with the signal generator 310 and the receiver 318 similar to the controllers 102 and 202. However, in another embodiment, the functionality of controllers 102 and 202 associated with the signal generator 310 and receiver 318, respectively, may be separated but within the same system 300. That is, the system 300 may include controllers 102 and 202 coupled to the respective signal generator 310 and receiver 318. In the system 300 the functionality of controllers 102 and 202, whether implemented together or separate, may be substantially synchronized. Accordingly, phase measurements made by the system 300 may be made relative to the phase of the modulation of the modulated signal 308.

Figure 4:
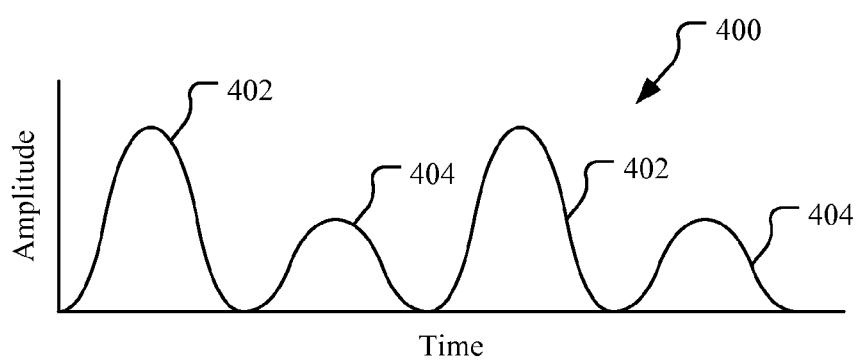
FIG. 4 is a graph of an example of a signal generated by a signal generator according to an embodiment.

FIG. 4 is a graph of an example of a signal generated by a signal generator according to an embodiment. In this embodiment, the modulated signal 400 includes a series of pulses 402 and 404. Note that the modulation of the modulated signal 400 is illustrated rather than the modulated signal 400 itself. For example, pulses 402 and 404 may form the envelope of an amplitude modulated signal 400.

In this embodiment, the pulses 402 and 404 repeat over time. The pulses 402 and 404 may have a generally sinusoidal shape. However, in other embodiments, the pulses may have other shapes, such as triangle, sawtooth, square shaped pulses, a combination of such pulses, or the like.

The pulses 402 and 404 of the signal 400 have different amplitudes. In this embodiment, the pulse 402 is about twice the amplitude of the pulse 404. However, in other embodiments, the amplitude ratios may be different. As will be described in further detail below, the amplitude difference or ratio may be selected to balance accuracy of the measurements made using the pulse train.

In this embodiment, the pulses 402 and 404 alternate with each other. The higher amplitude pulse 402 alternates with the lower amplitude pulse 404. Accordingly, the modulation of the modulated signal 400 includes both a higher frequency component from the individual pulse repetition and a lower frequency component from the change in amplitude of the pulses. Accordingly, the modulated signal 400 may include a substantially continuous dual-frequency amplitude modulation.

Although a single lower amplitude pulse 404 has been described as being interleaved with a single higher amplitude pulse 402, different numbers of pulses may be interleaved. For example, two or more higher amplitude pulses 402 may be interleaved with one or more lower amplitude pulses 404. The pulses may be selected to achieve the desired frequency components, achieve a desired accuracy, or the like. In an embodiment, every n-th pulse may be higher or lower than other pulses. Accordingly, the resulting signal will have a higher frequency component and a lower frequency component at 1/n of the frequency of the higher frequency component.

As will be described in further detail below, a system such as system 300 described above, may integrate or demodulate the modulated signal 400 in different ways designed to measure multiple phases of the modulated signal 400. In this embodiment, there are two phases of interest: the phase of rapid pulsing of the signal 400, and the phase of slower modulation of the amplitude of the pulses.

Figure 5:
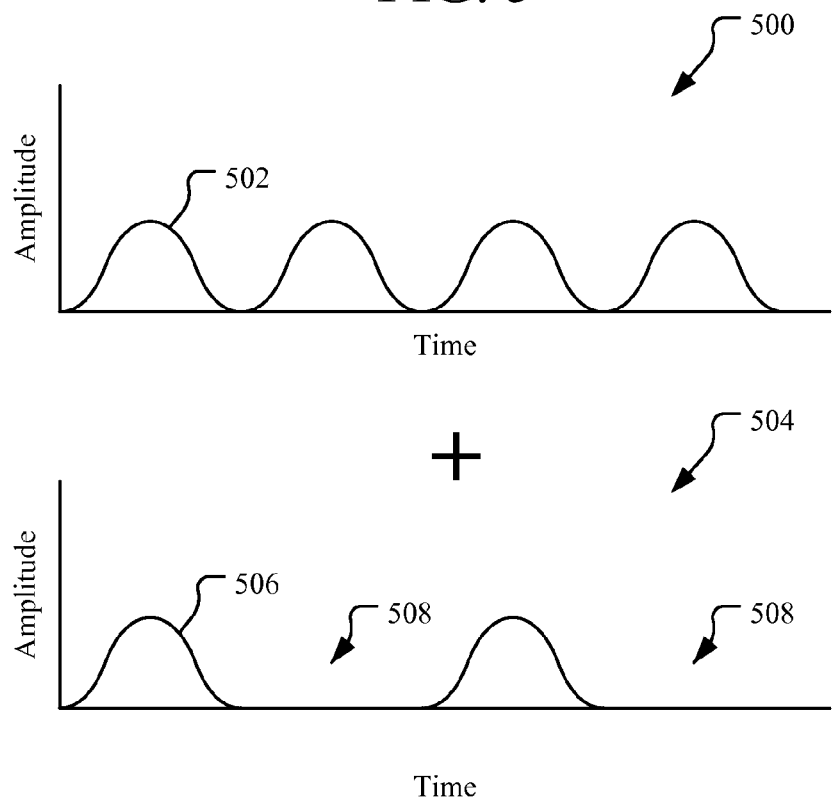
FIG. 5 includes graphs illustrating an example of technique to generate the signal of FIG. 4 according to an embodiment.

FIG. 5 includes graphs illustrating an example of technique to generate the signal of FIG. 4 according to an embodiment. In this example, two signals 500 and 504 are generated. Signal 500 includes repeating pulses 502 having substantially similar amplitudes. In contrast, signal 504 includes pulses 506 similar to pulses 502 interleaved with omissions of pulses 508. When these signals 500 and 504 are combined together, they may form a pulse train similar to signal 400 of FIG. 4. In an embodiment, the signals 500 and 504 are combined together using a technique that results in summation of the signals 500 and 504. For example, as will be described in further detail below, the signals 500 and 504 may be summed by combining two or more signals generated by different signal generators.

In an embodiment, the signals 500 and 504 may be generated by using multiple discrete signal generators. Two or more independently drivable solid state emitters, such as two laser diodes, two light emitting diodes (LEDs), or two arrays of LEDs, or the like, may be configured in such a way that they will emit light into substantially overlapping spatial regions. For example, two emitters may be configured to emit light into substantially the same solid angle. In another example, an array of LEDs configured to emit light into substantially the same solid angle may have alternating LEDs that are independently drivable. In yet another example, the signal generators may be coupled together such that the outputs of each are coupled together such that the emitted signals combine together into a substantially single signal. For example, two laser diodes may be coupled together with an optical coupler. Although examples of a one to one correspondence of signals and emitters have been described above, signals may be used to drive multiple emitters. For example, multiple LEDs of an LED array may be driven with signal 500 while other LEDs of the array are driven with signal 504.

In an embodiment, the signals 500 and 504 may be generated by driving signal generators with rectangular voltage/current pulse trains of appropriate frequency and duty cycle. For example, a 20 MHz frequency signal with a duty cycle of about 0.5 may be used to drive one signal generator, and a 10 MHz frequency signal with a duty cycle of about 0.25 may be used to drive another signal generators. In another example, each of the signal generators, or just one signal generator, may be driven with one rectangular 20 MHz signal with a 0.5 duty cycle where every other pulse would be higher than the preceding pulse.

Figure 6:
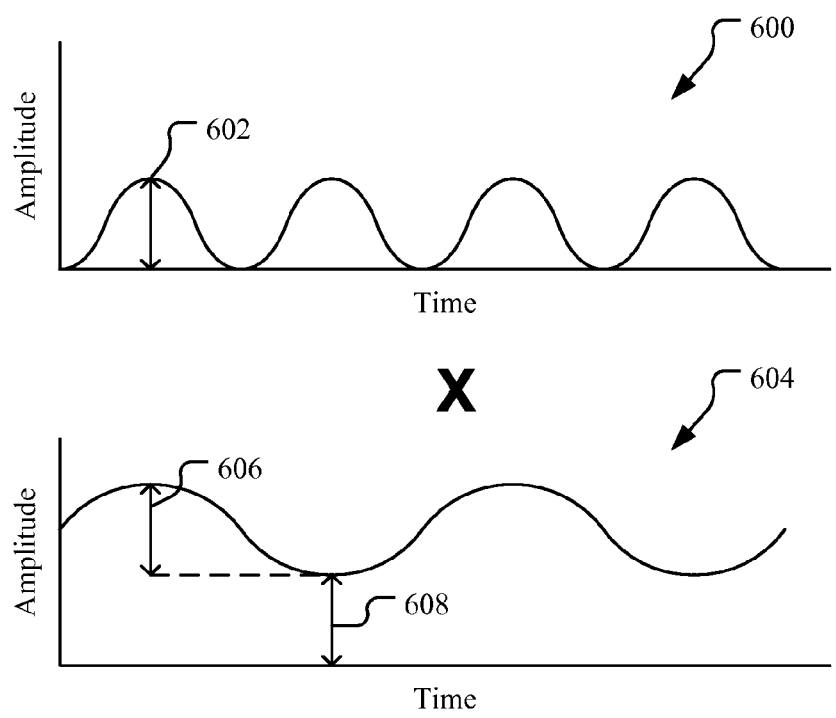
FIG. 6 includes graphs illustrating an example of technique to generate the signal of FIG. 4 according to another embodiment.

FIG. 6 includes graphs illustrating an example of technique to generate the signal of FIG. 4 according to another embodiment. Although forming a modulated signal 400 has been described using pulses and multiple emitters, the signal 400 may be formed in other ways. In this embodiment, two multiplicatively combined amplitude modulations are used. A first modulation 600 is a sinusoidal modulation changing between a first level 602 and substantially zero. The frequency of the first modulation 600 may be the higher desired frequency of the modulated signal 400, i.e. the frequency of the pulses.

A second modulation 604 is also a sinusoidal modulation. The modulation 604 has an amplitude 606 and an offset 608. The modulation 604 has a frequency that may be a lower desired frequency of the modulated signal 400, i.e. the frequency of the change in the amplitude of the pulses. The modulated signal 604 defines a desired variation of the amplitude of the pulses of the modulated signal 400. The peaks of the modulation 604 are aligned with some pulses of the modulation 600 while the troughs of the modulation 604 are aligned with adjacent pulses of the modulation 600. Accordingly, the amplitude of signal 600 may be multiplied substantially continuously by the amplitude of the signal 604 to create the modulated signal 400.

Although the techniques described with respect to FIGS. 5 and 6 have been described as resulting in signals similar to the modulated signal 400, the resulting signals from the operations may be different. In some embodiments, a summation of signals 500 and 504 may result in a variety of frequency components from the pulse train of signal 504 while a multiplication of the modulations 600 and 604 may result in different frequency components due to the two frequencies and DC components. In an embodiment, the combined signal may have multiple frequency components beyond a mere summation of two signals. However, when either signal or similar signals are sampled as described herein, the resulting sampled signals may be substantially similar.

In an embodiment, the signals described above may represent a power of a modulated signal. For example, signals 500 and 504 may represent the power of modulated signals output from multiple signal generators. Similarly, signal 600 may represent a power of an intermediate modulated signal and signal 604 is a modulation applied to the intermediate modulated signal. In another example, signal 604 may represent the power of an intermediate signal and signal 600 is the modulation applied to the intermediate signal.

Although power has been used as an example of what is modulated, other physical characteristics of a signal may be modulated appropriate to the signal generators and receivers. In other embodiments, the amplitude, phase, frequency, or the like of the signal may be changed to create the modulated signal with appropriate transmitters and receivers. For example, signal 400 above may represent the frequency of a modulated signal. An associated receiver may include a frequency demodulator. The demodulated signal may then be sampled as described herein.

Figure 7:
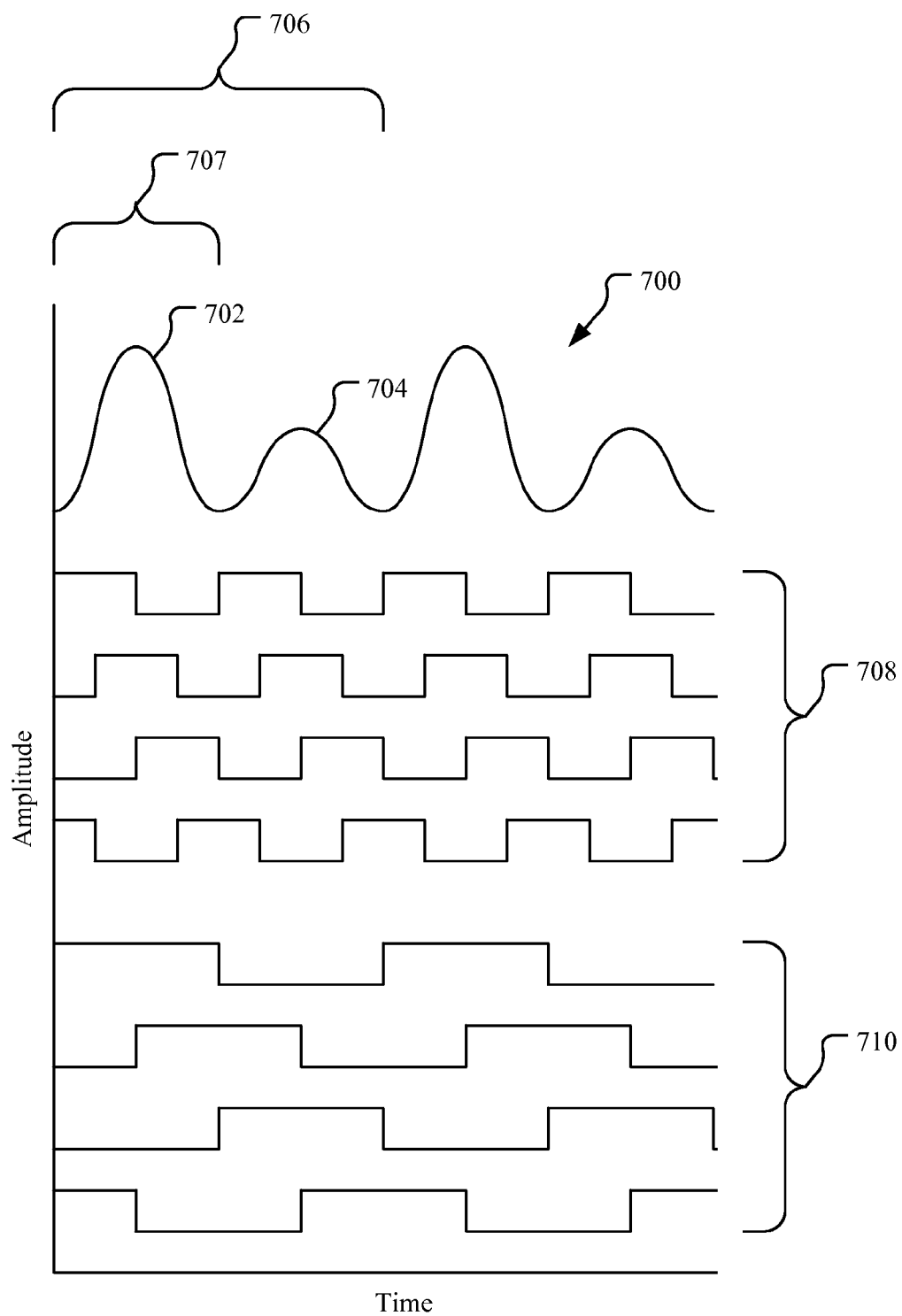
FIG. 7 is a graph of signals used in processing a received signal according to an embodiment.

FIG. 7 is a graph of signals used in processing a received signal according to an embodiment. Referring to FIGS. 3, 4, and 7, signal 700 is similar to signal 400, having pulses 702 and 704. The pulse train 706 repeats in signal 700.

Using an optical signal generator 310 as an example, a light source may emit a modulated signal 308 having a modulated intensity similar to signal 700. The light beam may travel to an object 320, reflect from it, and then travel to the receiver 318. The receiver 318 is configured to receive modulated signal 312. Modulated signal 312 represents the modulated signal 308 that has arrived at the receiver 318 plus any background signals, noise, or the like. The receiver 318 may be configured to filter out some or all of ambient light background that may be present from the reflected light beam. Such filtering may be performed in a variety of ways. For example, wavelength filtering may be used to pass wavelengths used by the modulated signal 308. In another example, appropriate timing of integration of signal 312 in receiver 318 may be used. Accordingly, the received modulated signal 312 may have a modulation substantially similar to signal 700. Signal 700 will be used as an example of the received modulated signal 312.

The controller 302 may be configured to control the timing of integration of signal 700, in the receiver 318. The integration of the signal 700 may be timed in such a way that phase, amplitude and offset of at least one of the two superimposed modulations evident in the signal 700 can be calculated from integration results. The results, in the form of a plurality of digital or analog signals, may be obtained sequentially or in parallel, and one integration or a series of integrations may be performed to obtain each of the resulting plurality of signals. The controller 302 may be configured to choose which of the superimposed modulations of signal 700 is to be of interest at any given time. In this example, the controller 302 may be configured to choose the fast modulation with period 707 substantially equal to the duration of one pulse in signal 700 or the slower modulation with period 706 substantially equal in duration to period of the pulse train of signal 700. The controller 302 may also be configured to determine substantially simultaneously the phases, amplitudes and offsets of the fast and slow modulation, if the receiver has the capability to produce the associated plurality of integration results in parallel.

For phase, amplitude, and offset of one signal modulation of interest to be calculable, at least 3 integrals of the amplitude of the modulated signal 700 representing 3 different phases of the modulation of interest must be collected. For each integral to represent a different modulation phase, it must be obtained by integrating the signal 700 over a part (e.g. ⅓, ¼ or ½) of the modulation period, and the integration must start and end at a specific modulation phase, i.e. it must be synchronized with the modulation. Such synchronized integration may be repeated over many consecutive periods of the signal modulation of interest, until the total signal integral is large enough to be measurable and have an acceptable signal to noise ratio. Moreover, even though obtaining 3 different signal integrals in this fashion is a minimum to determine the phase, amplitude and offset of the modulation of interest, more than 3 integrals may be obtained—4 or 8 are typically obtained in existing TOF depth sensors.

From the signal integrals collected from the receiver 318, the controller 302 is configured to determine the phase of the modulation of interest in the modulated signal 312. The controller 302 is also configured to receive information about the corresponding phase of signal 308 from the signal generator 310. Alternatively, the controller 302 may receive this information from a system substantially similar to the receiver 310 dedicated to measuring phases of the dual modulation of the signal 108. From the difference between corresponding modulation phases of the signals 308 and 312, the sum of distances traveled by the signal 308 to a signal reflecting object 320 and by the reflected signal 312 to the receiver 318 may be calculated. However, the calculation involves an ambiguity stemming from the periodicity of signal modulation. This ambiguity can be removed by calculating the same signal travel distance from 2 phases of 2 different signal modulations of the signal 312.

Equation 1 gives the wavelength of the modulation:

$$\lambda = cT, \tag{1}$$

Here, c is the speed of signal propagation in the particular medium (i.e. the speed of light in air) and T is the period of signal modulation. When 2 identically and synchronously modulated signals are generated, and then they travel in the same medium along 2 paths whose lengths differ by an integer multiple of the modulation wavelength $\lambda$, their modulation phases at the end of their paths are substantially the same. In other words, a specific phase difference $\phi$ can result from signal travel over any of the distances given by Equation 2.

$$d_k = \lambda \cdot \left( \frac{\varphi}{2\pi} + k \right) \tag{2}$$

Here, $\lambda$ is defined by equation 1, and k is an integer number equal to or greater than 0. Accordingly, the same measured phase difference $\phi$ may correspond to multiple distances. Some of these distances may be ruled out, in specific embodiments and modes of their use, by considering which paths of signal travel are possible and which are not. However, if at least 2 signal travel distances can result in substantially the same phase difference $\phi$, the correspondence between the $\phi$ and distance is ambiguous.

In an embodiment, because of the dual modulation of the signal 312, substantially similar to the signal 700, the distance corresponding to measured difference in phase of one modulation may be disambiguated by measuring difference in phase of the second modulation. Determining each of the phase differences requires integrating the signal 700 as described above. The integrations involved may be substantially represented by rectangular sampling signals shown in FIG. 7. The 4 signals 708 represent 4 integrations of the signal 700 intended to produce 4 integrals corresponding to 4 different phases of the fast signal modulation, whose period T equals the duration 707 of a single pulse 702 or 704. The time intervals when the signals 708 are high and low represent times when the signal 700 is integrated and not integrated, respectively. The signals 708 all have 0.5 duty cycle, which represents integration of the signal 700 for ½ of the period T. Each of the signals 708 is offset from the others by a multiple of T/4. Accordingly, the results of the 4 integrations represented by the signals 708 are sufficient to calculate phase of the fast modulation of the signal 700.

The pulses 702 and 704 in signal 700 have a high and low amplitude, respectively. Hence, integrating the signal 700 over any one period when one of the sampling signals 708 is high may produce different results, depending on different amount of time overlap between that period and the high and low pulses 702 and 704. However, the result of integrating the signal 700 over 2 consecutive high periods of a particular sampling signal is always the same, because it is proportional to the average of the high and low pulse amplitudes. This is because the first of the 2 integration periods overlaps a high pulse as much as the second period overlaps a low pulse, and vice-versa, and therefore the amplitudes of the pulses are effectively averaged. This amplitude averaging takes place also during integration of the signal 700 over any even number of high periods of any sampling signal 708. Moreover, integration over a large odd number of high periods necessarily yields a result very close to the result of integrations over the nearest even numbers of high periods, so a sufficiently long integration of the signal 700 always averages the amplitudes of its pulses. In sum, the integrations represented by signals 708 can be done in such a way that their results are proportional to the average pulse amplitude of the signal 700, and independent of the amplitude difference between consecutive pulses. Accordingly, this amplitude difference may be prevented from having a substantial effect on phase difference φ calculated from the integration results.

Sampling signals 710 can be used similarly to the signals 708 to obtain a second phase difference corresponding to the slower amplitude modulation of the signal 700, whose period T equals the length 706 or the combined duration of the pulses 702 and 704. In an embodiment, the sampling signals 710 may have the same period or, in other words, their frequency may be lower than the frequency of the signals 708. All other characteristics of the signals 710, including their number, their duty cycle, and time or phase offsets between them, may be, in one embodiment, substantially the same as the corresponding characteristics of the signals 708. In other embodiments, there may be differences between some characteristics of the signals 708 and 710, e.g. the latter may have a different duty cycle than the former. Moreover, in different embodiments, the ratio of the frequency of signals 708 to the frequency of the signals 710 may be higher than the value of 2 implied by FIG. 7. This ratio is equal to the ratio of frequencies of the fast and slow modulations of the signal 312. If the signal 312 is substantially like the signal 700, the ratio is 2. If the signal 312 may be substantially like the signal 800 depicted in FIG. 8 described below, the ratio may be 3, and so on.

The controller 312 may receive from signal generator 310 or another device the information about the phases of modulation of the signal 308. In an embodiment, referring to FIGS. 1 and 2, the operation of the controllers 102 and 202, and, by extension, of the devices 110 and 210 that they control, may be synchronized, e.g. by slaving the controllers to the same master clock. Referring to FIG. 3, other ways of relating the phases of modulation of the signal 308 to the modulation of the signal 312 may be used in other embodiments.

In an embodiment, the integrations of the signal 700 defined by the sampling signals 708 suppress the low frequency component of the signal 700 modulation, as described above. Likewise, the integrations defined by the sampling signals 710 substantially suppress the high frequency component. Thus, the 2 phase differences obtained by using the sampling signals 708 and 710 substantially correspond to the fast and slow components, respectively, of the signal 700 modulation. In different embodiments, the accuracy and independence of the 2 phase differences may vary. For example, using the sampling signals 710 or other substantially similar signals such as those described below, an accuracy of measurements of the phases of the slow modulation and fast modulation of the signals 700 and 800 may be different.

From the 2 phase differences corresponding to the fast and slow modulation of the signal 312, the controller 312 is configured to calculate the sum of distances traveled by these signals. In an embodiment, these distances may be substantially the same, and may be identified with the distance from some reference point to the object 320. Such is the case when both the signal generator 310 and receiver 318 are close to the reference point, and the object 320 is relatively far from the reference point. In other embodiments not satisfying these conditions, the relation between variously defined distances to objects and the corresponding total distances traveled by the signals 308 and 312 may be more complicated than the simple 1 to 2 ratio. Nevertheless, the distances to objects may still be calculable from modulation phases of the signals 308 and 312.

In an embodiment, less than 5 phase offsets of the sampling signals 708 and 710 may be used. For example, as described above, 4 phase offsets are illustrated for the sampling signals. In another example, three phase offsets may be used. By using less phase offsets, additional circuitry, longer time periods for integration using additional phase offsets, or the like may not be needed.

In an embodiment, generation of the sampling signals 708 and 710 may be implemented in the device integrating the signal 700 in response to the signals 708 and 710, e.g. the receiver 318. In another embodiment, the sampling signals may come from another device, e.g. the controller 302, connected to the integrating device in a way resulting in the sampling signals' quality and timing being sufficient for measurement. In yet another embodiment, the sampling signals 708 and 710 may control a device (e.g. an optical shutter) gating the signal 312 (e.g. a light signal) before it reaches the receiver 318 (e.g. an image sensor).

Although the sampling signals 708 and 710 have been illustrated as being substantially simultaneous, for each of the sets of the sampling signals 708 and 710, the integrations using single sampling signals may be performed in parallel, in series, in series with subsets of the sampling signals 708 and 710, or the like. Moreover, the integrations using the sets of sampling signals 708 and 710 may be performed sequentially or simultaneously. In other words, the integration using sampling signals 708 and 710 may be performed in any order with any amount of parallelism.

In an embodiment, the signal 312 may be light signals with intensity modulated similarly to the signal 700, and the receiver 210 may be an imaging TOF depth sensor that uses electronic rolling shutter (ERS) integration scheme. The 2 signal integration modes represented by the set of signals 708 and 710 may be used sequentially in this embodiment, and transitioning from one mode to the other will not cause the sensor 310 to produce invalid frames that must be dropped. This is due to the continuity of the dual-frequency modulation of the light signal 312.

In contrast, when a light signal whose modulation toggles between 2 different modes (and therefore includes discontinuities) is continuously integrated by an ERS TOF depth sensor toggling between 2 integration modes (corresponding to the modulation modes of the signal), some of depth frames produced by the sensor will necessarily be invalid. For example, this statement is true for an ERS TOF depth sensor using the signals 708, then the signals 710, then 708 again, and so on in a continuous series, to integrate a light signal whose intensity modulation is sinusoidal and toggles between 2 different oscillation frequencies (matching the frequencies of the signals 708 and 710).

In an ERS image sensor, integration of light in each row of pixels starts and ends at points in time that are different from the corresponding start and end points for all other rows. In other words, integrations done in different rows are staggered. If the integrations in each row are controlled by the series of sampling signals 708, 710, 708, . . . mentioned above as an example, then, at some point in time, one row of pixels may be just starting to receive the 1st sampling signal from the set 710, while other rows (above) may have been receiving this signal for some time already, and yet other rows (below) may be still receiving the last signal from the set 708. If the frequency of the oscillating light signal is changed at this point in time from high to low, this transition coincides with change of integration mode in only one row of pixels. Pixels in all the other rows for a time integrate the light signal using a wrong integration mode or sampling signal. Either the first sampling signal from the 710 set is used in the last moments of fast light intensity oscillation or the last sampling signal from the 708 set is used to integrate light intensity that already is oscillating slowly. This necessarily makes the results of the integrations done in all but one rows incorrect (to a varying degree). Clearly, this is not the case when the light signal modulated as the signal 700 is used, because there are no mode-to-mode transitions or discontinuities in the modulation of the signal 700.

Although the signal 700 has been used above as an example of modulated signals lacking mode-to-mode transitions or discontinuities, different embodiments of the system 300 could use different signals with the same property of continuity to measure distance by way of sequential 2-mode signal integration without ever getting invalid integration results. In yet other embodiments, the signals used may not have the same property of continuity at all times, i.e. may have occasional discontinuities. However, by substantially excluding the times when these occur, the system 300 may integrate the signals and switch between different integration modes without getting invalid integration results.

Although the sampling signals 708 and 710 have been illustrated as all having the same duty cycle of 0.5, in some embodiments this common duty cycle may be different, e.g. it may be about 0.25. In other embodiments, the signals 708 may have one common duty cycle, and the signals 710 may have another, and one or both of these duty cycles may be different from 0.5. For example, the signals 708 may have about a 0.375 duty cycle, while the signals 710 may have about a 0.325 duty cycle. The value of each duty cycle may be selected to minimize errors and maximize accuracy of phase differences calculated from results of signal integrations represented by the sampling signals 708 and 710. The duty cycle selected for each particular set of sampling signals may minimize random errors, i.e. noise, in the corresponding phase difference, may minimize systematic errors, or may be a compromise choice reducing errors of both types. In embodiments in which the signal 312 is substantially like the signal 700, setting the duty cycles of the sampling signals between about 0.325 and about 0.375 may maximize the accuracy of measured phase differences. However, in other embodiments, the duty cycles of the sampling signals may be selected on the basis of considerations other than the phase measurement accuracy or error.

Figure 8:
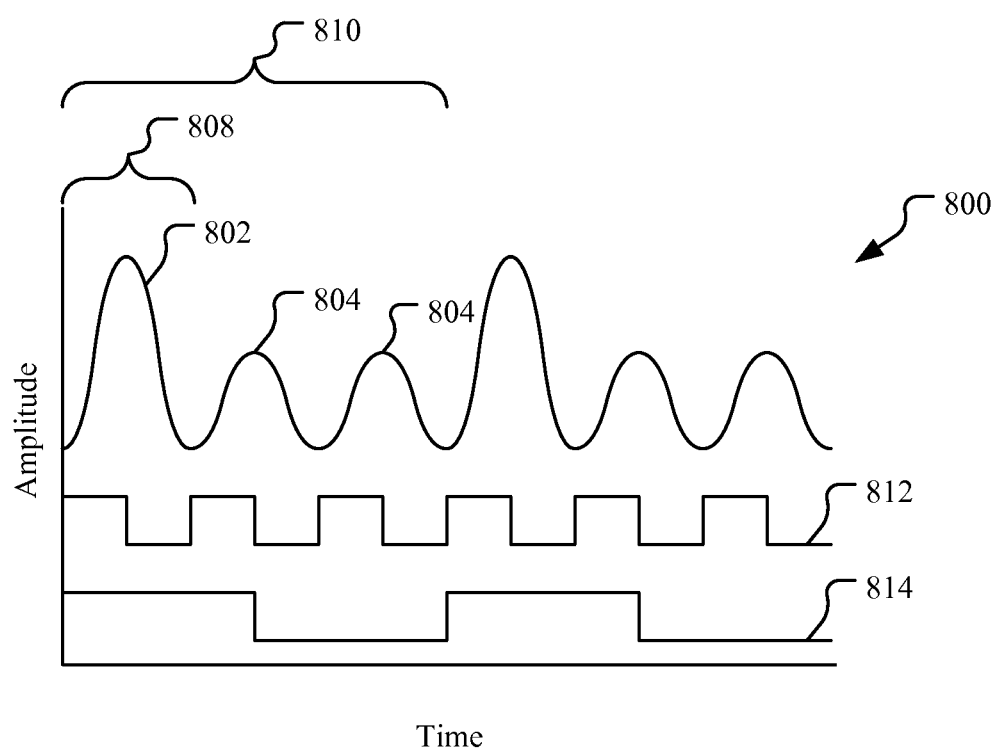
FIG. 8 is a graph of signals used in processing a received signal according to another embodiment.

FIG. 8 is a graph of signals used in processing a received signal according to another embodiment. In this embodiment, a signal 800 includes pulses 802 and 804. Pulse 802 has a higher amplitude than pulse 804. The pulses 802 and 804 each have a period 808. The pulses 802 and 804 repeat every period 810. Here, there are three pulses, pulse 802, a first pulse 804 and a second pulse 804 within the period 810.

Sampling signals 812 and 814 may be used to integrate the signal 800. Only one sampling signal with one phase is illustrated for each of sampling signals 812 and 814. However, similar to the sampling signals 708 and 710 described above, multiple phases may be used. These phases are not illustrated for clarity.

Here, the sampling signal 812 has a period similar to the period of a single pulse of pulses 802 and 804. Sampling signal 814 has a period that is three times the period of the pulses 802 and 804. Using the sampling signals 812 and 814, phase measurements may be generated. From these phase measurements a distance may be calculated.

The signals 700 and 800 and sampling signals 708, 710, 812, and 814 of FIGS. 7 and 8, are merely examples of types of signals and corresponding sampling signals that may be used. In an embodiment, the amplitudes of the pulses of a signal may be modulated with an envelope corresponding to second, third, fourth, etc. frequencies to be used in phase measurements. For example, the signal 700 may be a pulse train modulated with a sinusoidal envelope with a period of two pulses and having a fixed offset. In another example, the signal 800 may be a pulse train modulated with a sawtooth envelope. Although particular examples of envelopes have been given, other envelopes, multiple combined envelopes, or the like may be used.

Although the frequency of the modulation of the amplitude may be described above as being one third of the frequency of the individual pulses 802 and 804, a different frequency may be used. For example, a pulse train may be modulated with a sinusoid having an offset and a frequency that is one fifth of the pulse frequency. The corresponding sampling signal may also have a frequency that is one fifth of the pulse frequency and phase offsets used during measurement spread over a period that is five times the pulse period.

Moreover, although frequencies that are integer multiples of each other have been described above, in other embodiments, frequencies of the pulses may be non-integer multiples. For example, in an embodiment the ratio of the frequencies or the periods may be a rational number, i.e. a fraction of two integers. However, in other embodiments, the ratio may be an irrational number.

Figure 9:
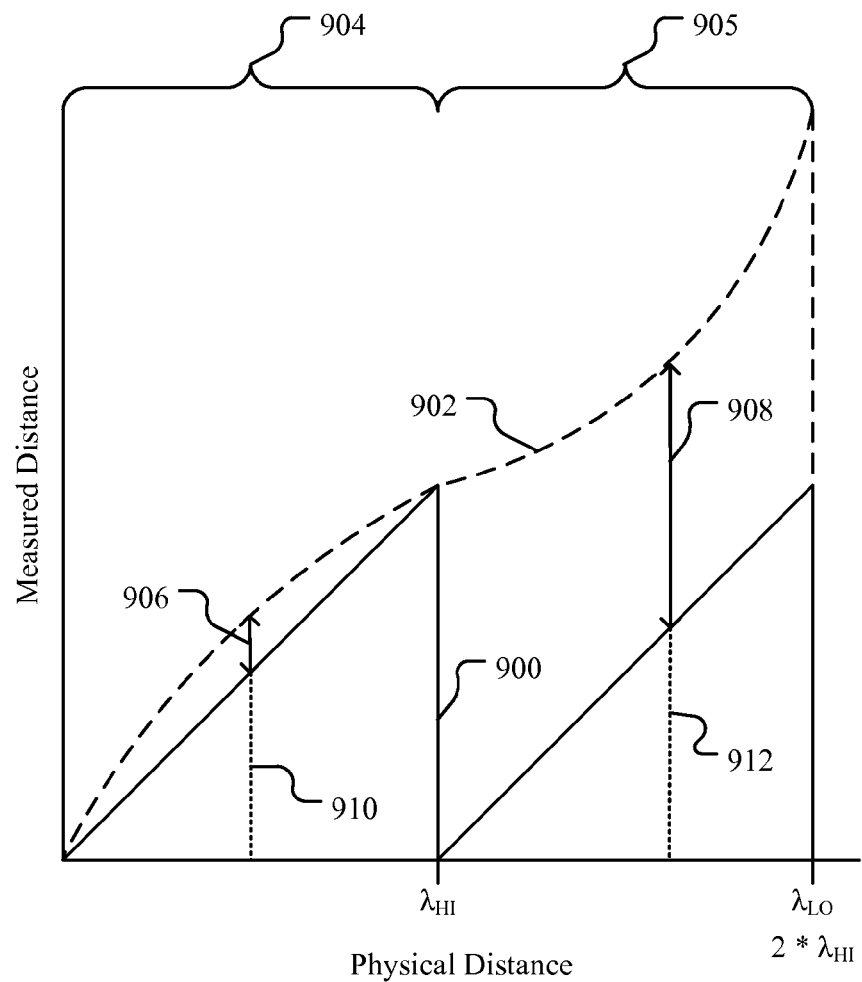
FIG. 9 is a graph of measured distance vs. physical distance according to an embodiment.

FIG. 9 is a graph of measured distance vs. physical distance according to an embodiment. Referring to FIGS. 3, 7, and 9, the controller 302 may be configured to receive the signals 316 from the receiver 318. The signals 316 may be the results of the integrations, defined by the sampling signals 708 and 710, of signal 312, substantially similar to signal 700. The signals 316 may also be phase differences calculated from the results of integrations, signal travel distances calculated from the phase differences or distances from signal generator 310 and/or signal receiver 318 to objects like 320. In sum, the exact nature of the signals 316 may depend on the amount of signal processing done in different embodiments of the receiver 318.

In an embodiment, the controller 302 may be configured to generate a distance in response to the signals 316. The signals 316 may at times include the results of integrations of signal 208 done according to the sampling signals 708. At other times or concurrently, the signals 316 may include the results of signal integrations corresponding to the sampling signals 710. The generating of distance from these results may yield two distance measurements, substantially simultaneously in a sequence sufficiently compressed in time for the measurements to be paired as reflecting substantially the same spatial arrangement of objects like 320 in the paths of the signal 308, or the like. Each distance measurement in a pair may comprise one distance value corresponding to one signal propagation path or a plurality of distance values corresponding to many paths. A plurality of distance values may form a 3-dimensional image of objects in the space traveled by the signals 308 and 312. In each pair of distance measurements, the measurement corresponding to the sampling signals 708 may be designated as the first distance measurement. Curve 900 in FIG. 9 shows the relation between a plurality of physical distances to objects like 320 and the plurality of corresponding measured distances that may be the results of the first distance measurement. In this curve, there is a discontinuity at the physical distance equal to the wavelength $\lambda_{HI}$ of the fast modulation of signal 700, where the signal phase difference calculated from the results of signal integrations reaches $2\pi$ and wraps around to 0, and the measured distance likewise wraps around from $\lambda_{HI}$ to 0. As a result of this wraparound, the results of the first distance measurement are unambiguous only if the physical distances are somehow constrained to be less than $\lambda_{HI}$.

A plurality of measured distances that may be the results of the second distance measurement (corresponding to sampling signals 710) is depicted by the curve 902. This curve is continuous over the range of physical distances shown because the upper limit of this range was chosen to be the wavelength $\lambda_{LO}$ of the slow modulation of the signal 700. Accordingly, no wraparound of phase difference and measured distance occurs within this range, and the second distance measurement yields unambiguous results for all physical distances within it. Here, $\lambda_{LO}$ corresponds to 2 times $\lambda_{HI}$. Thus, the second distance measurement yields unambiguous results over two ranges of the first distance measurement.

Curve 902 has an undulation to illustrate that the result may have a larger systematic error than the result of the first measurement. The magnitude of this systematic error may vary in different embodiments, as it depends on a number of factors, for example, on the duty cycle of the sampling signals 710.

Even with a substantial systematic error present in curve 902, substantially accurate distance measurements may be made within the range of physical distances shown in FIG. 9 by combining the results of the first and second distance measurements (using, respectively, the sampling signals 708 and 710). The result of the first measurement, represented by some point on the curve 900 may be disambiguated using the corresponding point on the curve 902, representing the second measurement.

For example, at physical distance 910, a difference between the results of the first and second measurements is difference 906. The difference 906 stems from systematic and random errors in the two results, whose relative significance may be different in different embodiments. However, the difference 906 is small enough to recognize the results of the second measurement as substantially the same as the result of the first measurement. This substantial similarity indicates that the result of the first measurement is not affected by phase difference wraparound, and does not have to be corrected for it. Due to larger error generally expected in the result of the second measurement, it may be deemed less accurate than the result of the first measurement, and therefore combining the two, e.g. by averaging, may be less preferable than just using the latter. However, different valuation and treatment of the two results may be chosen in different embodiments.

Similarly, at physical distance 912, the result of the first and second distance measurements differ by difference 908. The difference 908 is partly due to errors in the results, but its primary cause is the wraparound or discontinuity in the curve 900. Accordingly, the difference 908 is substantially the same as the wavelength $\lambda_{HI}$ of the fast modulation of the signal 700. The relatively large size of the difference 908 in comparison to the difference 906 indicates that the result of the first measurement is affected by wraparound and must be corrected for it by adding $\lambda_{HI}$. After this correction, it should be substantially similar to the result of the second measurement. The accuracy of the two results should then be considered in the same way as for the physical distance 906. The decision to use one or both of the result may, but does not have to be, based on that consideration.

Accordingly, in an embodiment, a threshold may be selected that is greater than a magnitude of the maximum expected error of curve 902 and less than the maximum unambiguous distance 904 minus the magnitude of the maximum error of curve 902. For example, the threshold may be one half of the maximum unambiguous distance 904. Accordingly, in the unambiguous range 905 of curve 900, the difference will be less than the threshold. In the first ambiguous range 905, the difference will be greater than the threshold. If the difference is greater, the measurement along curve 900 may be offset by the maximum unambiguous distance 904. As a result, any two identical measured distances on the two slopes of the curve 900 may be disambiguated using the corresponding distances on the curve 902.

In an embodiment, the error of a measurement generated using the lower frequency sampling signals 710 may be relatively large. Accordingly, a tradeoff between accuracy of a measurement using sampling signals 708 and a measurement using sampling signals 710 may be made towards an increased accuracy of the measurement using sampling signals 708. In other words, the accuracy along curve 900 may be increased at the expense of the accuracy along curve 902 as long as the error along curve 902 still allows an unambiguous determination of which range of the curve 900 the physical distance falls.

In an embodiment, the distance measurement using the higher frequency sampling signals 708 may be performed more often than the measurement using the lower frequency sampling signals 710. For example, the measurement using the sampling signals 708 may be performed 4 times for every one time the measurement using the sampling signals 710 is done. Although the ratio of 1:4 is given as an example, other ratios may be used. Any particular 1:N ratio is acceptable as long as the results of one measurement using the sampling signals 710 suffice to disambiguate the results of the N measurements using the sampling signals 708 that follow. The disambiguation is possible if the results obtained using the sampling signals 710 and 708 reflect substantially the same spatial arrangement of objects in the paths of signals 108 and 208.

Similarly, in embodiments in which the measurements using the sampling signals 708 and 710 are performed substantially simultaneously, the measurements using the signals 708 may be performed in a substantially continuous, uninterrupted series, while the measurement using the signals 710 may be performed only periodically.

Although the system 300 and the object(s) 320 may move relative to each other during and after a distance measurement using the sampling signals 710, the results of the measurement remain useful for the purpose of distance disambiguation as long as the movements do not change any distances substantially smaller than the distance 904 to distances substantially larger than 904, or the other way round. In other words, distances obtained in multiple measurements using the sampling signals 708 may be disambiguated using the results of just one previous measurement using the signal 710, as long as none of the differences between the latter and the former crosses the threshold described above due to the motion of the object(s) 320 relative to the system 300. The receiver 318 or the controller 302 may be configured to detect significant crossings of the threshold and to respond by performing a new distance measurement using the signals 710.

In an embodiment, the pulse shape of the signal 700 may be selected to increase the accuracy of the higher frequency based measurements. For example, a substantially sinusoidal pulse shape may result in more accurate distance values from the distance measurements using the sampling signals 708. The lower frequency modulation of the signal 700 may be selected to be just sufficient to permit distance disambiguation using the sampling signals 710 to operate as described above. Alternatively, the slower signal modulation may be used in substantially similar way to the fast modulation, to obtain accurate distance data, not just less accurate data needed to disambiguate the distances obtained using the signals 708.

Although only a second, lower frequency has been described above as being used to disambiguate measurements, additional lower frequency signals may be received and integrated as described above. For example, a third lower frequency signal may be present in the signal 312 that may be used to disambiguate a measurement made using the two distance measurements described above.

Referring to FIGS. 3 and 7, in an embodiment, the measurement of a phase using one set of sampling signals, such as one of sampling signals 708 and 710 of FIG. 7, may be performed substantially sequentially. That is, the controller 310 may switch between using the sampling signals 708 and 710. The duty cycle of the switching may, but need not be 0.5. That is, the controller 310 may be configured to perform more measurements of the phase using sampling signals 708 than with sampling signals 710.

Figure 10:
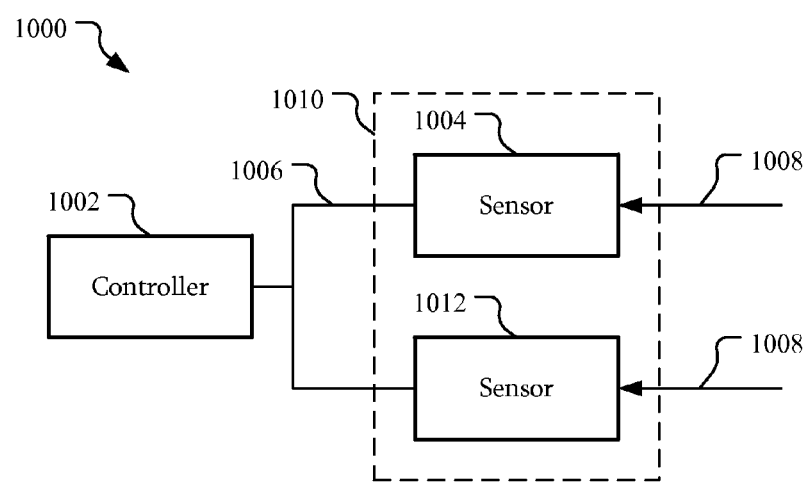
FIG. 10 is a schematic view of a measurement system according to another embodiment.

FIG. 10 is a schematic view of a measurement system according to another embodiment. In this embodiment, the system 1000 includes a controller 1002 coupled to a receiver 1010. The controller 1002 is configured to receive signals 1006 from the receiver 1010 similar to the other controllers and receivers described above. However, the receiver 1010 includes at least two sensors illustrated by sensors 1004 and 1012.

Each of the sensors 1004 and 1012 may be configured to receive a modulated signal 1008 and in response, generate a corresponding one of the signals 1006, such as a phase signal, and integration signal, or the like. Each of the sensors 1004 and 1012 may be configured to operate with a corresponding set of sampling signals. Using FIG. 7 as an example, sensor 1004 may be configured to sample the modulated signal 1008 using sampling signals 708 while sensor 1012 may be configured to sample the modulated signal 1008 using sampling signals 710. Accordingly, generating the signals 1006 may be performed substantially simultaneously.

In another embodiment, the generation of the signals 1006 may be performed partially simultaneously. For example, sensor 1004 may be configured to sample the modulated signal 1008 in response to sampling signal similar to sampling signals 812 of FIG. 8. However, the sensor 1004 may be configured alternate between sampling signals 814 and 816 when sampling the modulated signal 1008. In other words, a dedicated sensor 1004 may be configured to use the sampling signals associated with a higher frequency while lower frequency sampling signals are used with one or more other sensors 1012.

Figure 11:
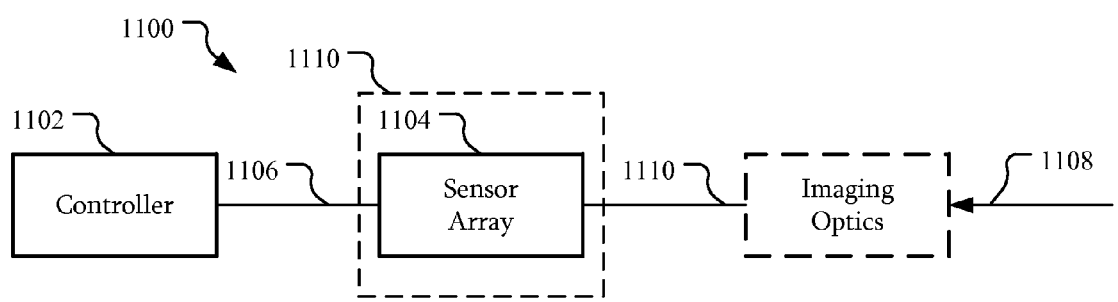
FIG. 11 is a schematic view of a measurement system according to yet another embodiment.

FIG. 11 is a schematic view of a measurement system according to yet another embodiment. In this embodiment, the system 1100 includes a controller 1102 coupled to a receiver 1110. The controller 1102 is configured to receive signals 1106 from the receiver 1110. The controller 1102 and receiver 1110 may be similar to the controller 1002 and receiver 1010 described above. However, the receiver 1110 includes a sensor array 1104.

In an embodiment, the system 1100 may include optics 1114. The optics 1114 are configured to receive an optical signal 1108 and provide a focused optical signal 1112 to the sensor array 1104. The controller 1102 may be configured to generate a distance measurement as described above from each sensor of the sensor array 1104, each group of sensors of the sensor array 1104, or the like. Accordingly, if a scene is illuminated with an optical signal modulated as described above, a depth image may be generated.

In another embodiment, the optics 1114 may not focus an image on the sensor array 1104 or alternatively, may not be present. However, a receiver 1110 with a sensor array 1104 may still be used due to the multiple sensors of the sensor array 1104. That is, the sensor array 1104 may be an array of individual sensors similar to sensors 1004 and 1012 described above and operated accordingly.

Figure 12:
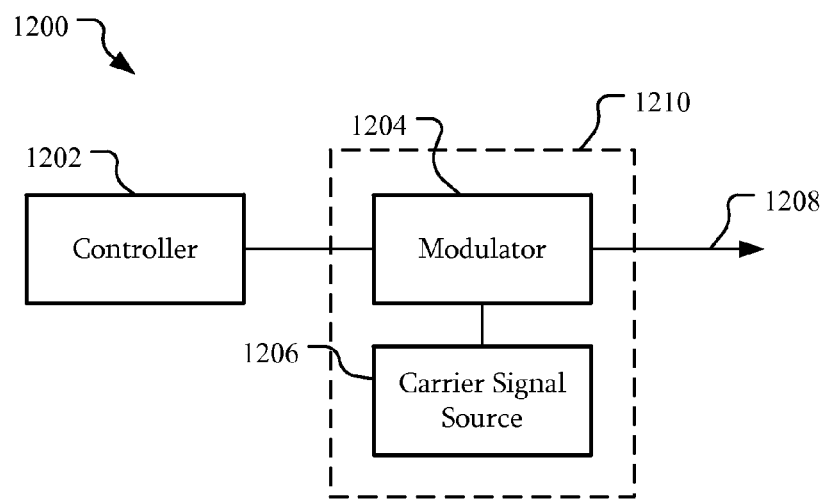
FIG. 12 is a schematic view of a signal generator according to another embodiment.

FIG. 12 is a schematic view of a signal generator according to another embodiment. In this embodiment, the system 1200 includes a controller 1202 coupled to a signal generator 1210. The signal generator 1210 is configured to generate a modulated signal 1208 in response to the controller 1202. The controller 1202 and signal generator 1210 may be similar to the controller 112 and signal generator 110 described above.

However, in this embodiment, the signal generator 1210 includes a carrier signal source 1206 coupled to an external modulator 1204. By using an external modulator 1204, different modulation techniques, higher speed modulation, or the like may be possible than with direct modulation of a source. For example, the carrier signal source 1206 may be a laser diode and the modulator 1204 may be an external optical modulator. In another example, the carrier signal source 1206 may be a microwave oscillator and the modulator 1204 may be a mixer. Any carrier signal source 1206 and modulator 1204 may be used as appropriate to the desired medium and modulation.

Figure 13:
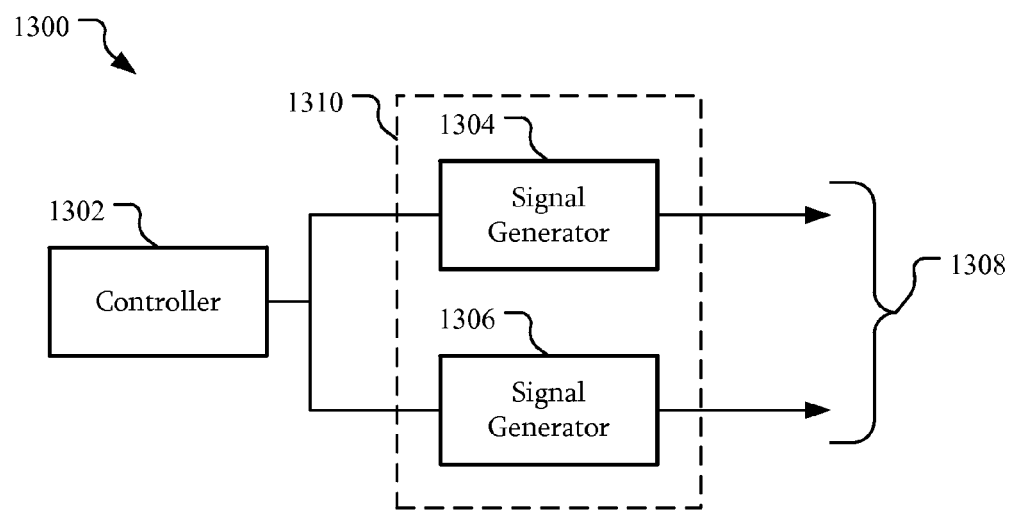
FIG. 13 is a schematic view of a signal generator according to another embodiment.

FIG. 13 is a schematic view of a signal generator according to another embodiment. In this embodiment, the system 1300 includes a controller 1302 coupled to a signal generator 1310. The signal generator 1310 is configured to generate a modulated signal 1308 in response to the controller 1302. The controller 1302 and signal generator 1310 may be similar to the controller 112 and signal generator 110 described above.

However, the signal generator 1310 may include multiple discrete signal generators, such as signal generators 1304 and 1306. The signal generators 1304 and 1306 may each be similar to the signal generator 110 described above. However, the signal generators 1304 and 1306 may be disposed in an array, adjacent one another, or otherwise disposed to generate the aggregate modulated signal 1308.

For example, the controller 1302 may be configured to cause one or more signal generators 1304 to generate a signal similar to the signal 500 of FIG. 5. The controller 1302 may also be configured to cause one or more other signal generators 1306 to generate a signal similar to the signal 504 of FIG. 5. Accordingly, the aggregate modulated signal 1308 may be a signal similar to the signal 400 of FIG. 4.

In an embodiment, a system may emit a light signal with an intensity continuously modulated at two frequencies, one an integer multiple of the other, and integrate the returning "echo" alternately over fractions of periods of the faster and slower modulation of the emitted signal. The frequency of switching between these two integration modes can be pre-set at some fraction of the system's integration repetition rate. In a particular embodiment, if the light signal modulation is about quasi-sinusoidal, these two integration modes may separate the two frequency components of the returning signal, thus yielding two phases for each signal-integrating component (pixel) of the TOF system. The phase corresponding to the slower signal modulation will uniquely identify any depth within the non-ambiguity range determined by the frequency of this modulation. At the same time, the precision of all depth measurements in this range will be determined by the phase corresponding to the faster signal modulation. Such precision may be increased due to the inverse proportionality of random depth error to both modulation frequency and modulation contrast, both of which will be higher for the faster signal modulation. The depth measurement precision may be negatively affected by the fact that the two phases will be measured sequentially, not simultaneously. However, as described above, switching between the two signal integration modes could be eliminated by simultaneously operating some pixels in a TOF system in one integration mode and some pixels in the other mode.

Although a variety of functions of a controller, a receiver, and a signal generator have been described above, the functions may be distributed among the controller, receiver, and signal generator. For example, in an embodiment, the measurements and calculations to determine a phase may be performed in the receiver; however, in another embodiment, the measurements and calculations to determine the phase may be performed in the controller.

Figure 14:
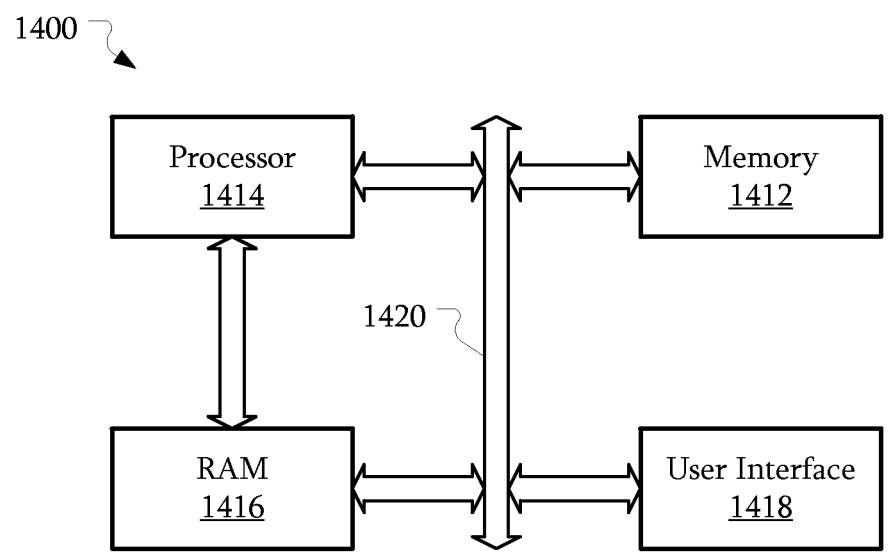
FIG. 14 is a schematic view of an electronic system which may include a ranging system according to an embodiment.

FIG. 14 is a schematic view of an electronic system which may include a ranging system according to an embodiment. The electronic system 1400 may be part of a wide variety of electronic devices including, but not limited to, rangefinders, surveying equipment, handheld measurement instruments, portable notebook computers, Ultra-Mobile PCs (UMPC), Tablet PCs, servers, workstations, mobile telecommunication devices, and so on. For example, the electronic system 1400 may include a memory system 1412, a processor 1414, RAM 1416, and a user interface 1418, which may execute data communication using a bus 1420.

The processor 1414 may be a microprocessor or a mobile processor (AP). The processor 1414 may have a processor core (not illustrated) that can include a floating point unit (FPU), an arithmetic logic unit (ALU), a graphics processing unit (GPU), and a digital signal processing core (DSP Core), or any combinations thereof. The processor 1414 may execute the program and control the electronic system 1400. The processor 1414 may be configured to perform some or all of the operations of the various controllers described above.

The RAM 1416 may be used as an operation memory of the processor 1414. Alternatively, the processor 1414 and the RAM 1416 may be packaged in a single package body.

The user interface 1418 may be used in inputting/outputting data to/from the electronic system 1400. For example, the user interface 1418 may include a display for viewing a measurement, input/output devices to perceive and generate a measurement, initiate a measurement, or the like as described above. The user interface 1418 may also include the signal generators and receivers described above. Moreover, the user interface 1418 may include controls to actuate a measurement system.

The memory system 1412 may store codes for operating the processor 1414, data processed by the processor 1414, or externally input data. The memory system 1412 may include a controller and a memory. The memory system may include an interface to computer readable media. Such computer readable media may store instructions to perform the variety of operations describe above.

Reference throughout this specification to "one embodiment" or "an embodiment" means that a particular feature, structure, or characteristic described in connection with the embodiment is included in at least one embodiment of the present invention.

Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A method, comprising:
   generating a modulated signal having a pulse train with pulses having varying amplitudes;
   receiving the modulated signal having modulation;
   generating a first signal in response to the modulation and a first sampling signal;
   generating a second signal in response to the modulation and a second sampling signal; and
   generating a distance in response to the first signal and the second signal;

wherein a ratio of a frequency of the first sampling signal to a frequency of the second sampling signal is a rational number.

2. The method of claim 1, wherein the frequency of the first sampling signal is twice the frequency of the second sampling signal.

3. The method of claim 1, wherein generating the first signal comprises generating the first signal using less than 5 phase offsets of the first sampling signal.

4. The method of claim 1, further comprising:
repeating the generating of the first signal; and
repeating the generating of the second signal;
wherein the generating of the first signal is repeated more often than the generating of the second signal.

5. A method, comprising:
receiving a modulated signal having modulation;
generating a first signal in response to the modulation and a first sampling signal;
generating a second signal in response to the modulation and a second sampling signal; and
generating a distance in response to the first signal and the second signal;
wherein a ratio of a frequency of the first sampling signal to a frequency of the second sampling signal is a rational number, wherein generating the distance comprises:
generating a first measurement in response to the first signal;
generating a second measurement in response to the second signal; and
offsetting the first measurement if a difference between the second measurement and the first measurement is greater than or equal to a threshold.

6. The method of claim 5, wherein offsetting the first measurement comprises increasing the first measurement by a maximum unambiguous distance of the first measurement if the difference between the second measurement and the first measurement is greater than or equal to the threshold.

7. The method of claim 1, wherein the pulse train includes pulses having a first amplitude alternating with pulses having a second, lower amplitude.

8. A system, comprising:
a receiver configured to receive a modulated signal; and
a controller coupled to the receiver and configured to:
generate a first signal in response to a modulation of the modulated signal and a first sampling signal;
generate a second signal in response to the modulation and a second sampling signal; and
generate a distance in response to the first signal and the second signal;
wherein a ratio of a frequency of the first sampling signal to a frequency of the second sampling signal is a rational number;
wherein the controller is further configured to generate the modulated signal having a pulse train with pulses having varying amplitudes.

9. The system of claim 8, wherein the frequency of the first sampling signal is twice the frequency of the second sampling signal.

10. The system of claim 8, wherein the controller is further configured to generate the first signal using less than 5 phase offsets of the first sampling signal.

11. The system of claim 8, wherein the controller is further configured to:
repeat the generating of the first signal;
repeat the generating of the second signal; and
repeat the generating of the first signal more often than the generating of the second signal.

12. A system, comprising:
a receiver configured to receive a modulated signal; and
a controller coupled to the receiver and configured to:
generate a first signal in response to a modulation of the modulated signal and a first sampling signal;
generate a second signal in response to the modulation and a second sampling signal; and
generate a distance in response to the first signal and the second signal;
wherein a ratio of a frequency of the first sampling signal to a frequency of the second sampling signal is a rational number, wherein the controller is further configured to:
generate a first measurement in response to the first signal;
generate a second measurement in response to the second signal; and
offset the first measurement if a difference between the second measurement and the first measurement is greater than or equal to a threshold.

13. The system of claim 12, wherein the controller is further configured to increase the first measurement by a maximum unambiguous distance of the first measurement if the difference between the second measurement and the first measurement is greater than or equal to the threshold.

14. A system, comprising:
a signal generator configured to generate a first modulated signal;
a receiver configured to receive a second modulated signal; and
a controller coupled to the modulator and the receiver, and configured to:
cause the signal generator to generate the first modulated signal with a repeating pulse train having pulse amplitudes with varying amplitudes;
generate a first signal in response to modulation of the second modulated signal and a first sampling signal;
generate a second signal in response to the modulation and a second sampling signal; and
generate a distance in response to the first signal and the second signal;
wherein a ratio of a frequency of the first sampling signal to a frequency of the second sampling signal is a rational number.

15. The system of claim 14, wherein the receiver comprises:
a user interface coupled to the controller and configured to receive a measurement signal;
wherein the controller is configured to generate the distance in response to the measurement signal.

16. The system of claim 14, wherein:
the receiver comprises a plurality of sensors, each sensor configured to sense a modulation of an incident modulated signal;
the controller is configured to, for each sensor:
generate a first signal in response to the modulation of the incident modulated signal and the first sampling signal;
generate a second signal in response to the modulation of the incident modulated signal and the second sampling signal; and
generate a distance in response to the first signal and the second signal.

* * * * *